(12) United States Patent
Chen

(10) Patent No.: US 12,337,382 B2
(45) Date of Patent: Jun. 24, 2025

(54) THREE-DIMENSIONAL PRINTING

(71) Applicant: PERIDOT PRINT LLC, Palo Alto, CA (US)

(72) Inventor: Tienteh Chen, Spring, TX (US)

(73) Assignee: Peridot Print LLC, Palo Alto, CA (US)

(*) Notice: Subject to any disclaimer, the term of this patent is extended or adjusted under 35 U.S.C. 154(b) by 888 days.

(21) Appl. No.: 17/296,664

(22) PCT Filed: Dec. 21, 2018

(86) PCT No.: PCT/US2018/067227
§ 371 (c)(1),
(2) Date: May 25, 2021

(87) PCT Pub. No.: WO2020/131112
PCT Pub. Date: Jun. 25, 2020

(65) Prior Publication Data
US 2022/0126366 A1 Apr. 28, 2022

(51) Int. Cl.
*B22F 10/14* (2021.01)
*B22F 1/103* (2022.01)
(Continued)

(52) U.S. Cl.
CPC .............. *B22F 10/14* (2021.01); *B22F 1/103* (2022.01); *B29C 64/165* (2017.08);
(Continued)

(58) Field of Classification Search
CPC .......... B22F 10/14; B22F 1/103; B33Y 70/10; C08F 220/1802; C08F 220/307; C08F 220/585; C08F 220/306; B29C 64/165; B29C 64/295

See application file for complete search history.

(56) References Cited

U.S. PATENT DOCUMENTS 6,858,301 B2 * 2/2005 Ganapathiappan .... C09D 11/30
428/407
9,682,166 B2 6/2017 Watanabe
(Continued)

FOREIGN PATENT DOCUMENTS

CN 105127361 6/2017
CN 107138678 9/2017
(Continued)

OTHER PUBLICATIONS

Chen et al. Chemical affinity of 10-Methacryloyloxydecyl dihydrogen phosphate to dental zirconia: Effects of molecular structure and solvents. Dental Materials 33 (2017) e415-e427. (Year: 2017).*

(Continued)

*Primary Examiner* — John E Uselding
(74) *Attorney, Agent, or Firm* — Dierker & Kavanaugh, P.C.

(57) ABSTRACT

An example of a three-dimensional printing kit includes a particulate build material including from about 80 wt % to 100 wt % metal particles based on a total weight of the particulate build material. The three-dimensional printing kit further includes a binder fluid including water and polymer particles in an amount ranging from about 1 wt % to about 40 wt % based on a total weight of the binder fluid. The polymer particles have from about 1% to about 10% of a phosphate functional group.

9 Claims, 2 Drawing Sheets

(51) Int. Cl.
  *B29C 64/165* (2017.01)
  *B29C 64/295* (2017.01)
  *B33Y 70/10* (2020.01)
  *C08F 220/18* (2006.01)
  *C08F 220/30* (2006.01)
  *C08F 220/58* (2006.01)
  *B33Y 10/00* (2015.01)

(52) U.S. Cl.
  CPC ............ *B29C 64/295* (2017.08); *B33Y 70/10* (2020.01); *C08F 220/1802* (2020.02); *C08F 220/306* (2020.02); *C08F 220/307* (2020.02); *C08F 220/585* (2020.02); *B33Y 10/00* (2014.12)

(56) References Cited

U.S. PATENT DOCUMENTS

| | | |
|---|---|---|
| 2016/0208121 A1 | 7/2016 | De Mondt et al. |
| 2017/0246760 A1 | 8/2017 | Colombo et al. |
| 2017/0320128 A1 | 11/2017 | Deters et al. |

FOREIGN PATENT DOCUMENTS

| | | | |
|---|---|---|---|
| EP | 2220182 A1 | 8/2010 | |
| WO | WO-2001068336 A2 | 9/2001 | |
| WO | 2009/078833 A1 | 6/2009 | |
| WO | WO-2015108546 A2 | 7/2015 | |
| WO | WO-2016161489 A2 | 10/2016 | |
| WO | 2018/056918 A1 | 3/2018 | |
| WO | WO-2018156143 A1 * | 8/2018 | ............ B33Y 70/00 |
| WO | WO-20180156143 | 8/2018 | |

OTHER PUBLICATIONS

"Sipomer® PAM Specially Monomers", Product Catalog, 2018, https://www.solvay.com/en/products/brands/sipomer-pam-specialty-monomers.

Solvay SIPOMER PAM-100 Esters of Polyethylane Glycol Monomethacrylate. 2018.

Solvay SIPOMER PAM-200 Phosphate Esters of Ppg Monomethacrylate. 2018.

Solvay SIPOMER PAM-4000 Ethylmethacrylate Phosphate; Alkyl Methacrylate Phosphate. 2018.

* cited by examiner

THREE-DIMENSIONAL PRINTING

BACKGROUND

Three-dimensional (3D) printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material (which, in some examples, may include build material, binder and/or other printing liquid(s), or combinations thereof). This is unlike traditional machining processes, which often rely upon the removal of material to create the final part. Some 3D printing methods use chemical binders or adhesives to bind build materials together. Other 3D printing methods involve at least partial curing, thermal merging/fusing, melting, sintering, etc. of the build material, and the mechanism for material coalescence may depend upon the type of build material used. For some materials, at least partial melting may be accomplished using heat-assisted extrusion, and for some other materials (e.g., polymerizable materials), curing or fusing may be accomplished using, for example, ultra-violet light or infrared light.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
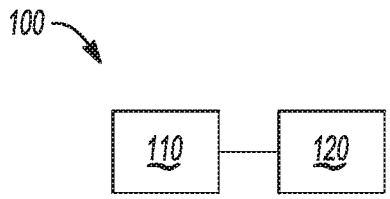
FIG. 1 schematically illustrates an example three-dimensional printing kit disclosed herein.

In some examples of three-dimensional (3D) printing, a binder fluid is selectively applied to a layer of build material on a build platform, thereby patterning a selected region of the layer, and then another layer of the build material is applied thereon. The binder fluid is then selectively applied to this other layer, and these processes may be repeated to form a green part (referred to herein as "3D intermediate part") of a 3D part/object that is ultimately to be formed. The binder fluid may be capable of penetrating the layer of the build material onto which it is applied, and/or spreading around an exterior surface of the build material and filling void spaces between particles of the build material. The binder fluid can include binder particles, such as polymer latex particles, that when cured, temporarily hold the build material of the 3D intermediate part together. The 3D intermediate part may be moved from the build platform to a separate device for heating to remove the binder particles and to sinter the build material particles of the patterned intermediate part to form the 3D part/object.

While the binder particles temporarily hold the build material of the 3D intermediate part/object together, the 3D intermediate part may also contain air voids. As such, the patterned intermediate part may be porous, which can reduce its rigidity and increase its fragility. On the build platform, the 3D intermediate part may be supported by adjacent non-patterned build material. However, the fragility of the 3D intermediate part may make it difficult to move the patterned intermediate part form the build platform to the separate device for heating.

In the examples disclosed herein, examples of the binder fluid include polymer particles having a phosphate functional group. The phosphate functional group of the polymer particles has been found to be effective in interacting or otherwise providing adhesion promotion between the polymer particles and the metal particles of the particulate build material. As such, the binder fluid including polymer particles having a phosphate functional group increases the tensile strength of the 3D intermediate part, which enhances its robustness and stability. Enhanced robustness and stability can render the patterned intermediate part strong enough to withstand extraction from the build platform and handling during transfer to the separate heating device.

As such, as used herein, the term "3D intermediate part" or "3D intermediate object" or "patterned intermediate part/object" refers to an intermediate part that has a shape representative of the final 3D printed part/object, and that includes build material particles that are bound together with polymer particles having a phosphate functional group. It is to be understood that any build material that is not patterned with the binder fluid is not considered to be part of the 3D intermediate part, even if it is adjacent to or surrounds the 3D intermediate part. For example, unprinted (non-patterned) particulate build material acts to support the 3D intermediate part while contained therein, but the non-patterned particulate build material is not part of the 3D intermediate part unless it is printed with binder fluid.

Also as used herein, "sinter" means to coalesce the build material into a solid or porous mass by heating it. In other words, sintering refers to the joining of the material of adjacent build material particles, and can include complete joining of the build material into a common structure. In some instances, sintering takes place without liquefaction of the build material. It is to be understood, however, that sintering may involve fusing, annealing, melting, etc. depending, in part, upon the build material used.

In accordance with this, the examples disclosed herein include three-dimensional printing kits, and methods for three-dimensional printing.

One example of the three-dimensional printing kit can include: a particulate build material including from about 80 wt % to 100 wt % metal particles based on a total weight of the particulate build material; and a binder fluid including water and polymer particles in an amount ranging from about 1 wt % to about 40 wt % based on a total weight of the binder fluid, the polymer particles having from about 1% to about 10% of a phosphate functional group.

One example of a binder fluid for three-dimensional printing includes: water; and polymer particles in an amount ranging from about 1 wt % to about 40 wt % based on a total weight of the binder fluid, the polymer particles having from about 1% to about 10% of a phosphate functional group.

One example of the method can include: iteratively applying individual build material layers of a particulate build material which includes from about 80 wt % to 100 wt % metal particles based on a total weight of the particulate build material; based on a 3D object model, selectively applying water and polymer particles having a phosphate functional group to individual build material layers to define individually patterned layers; and heating the individually patterned layers to form a 3D intermediate object.

It is noted that when discussing the three-dimensional printing kits and methods herein, each of these discussions can be considered applicable to one another whether or not they are explicitly discussed in the context of a particular example. Thus, for example, when discussing a binder fluid related to a three-dimensional printing kit, such disclosure is also relevant to and directly supported in the context of any other three-dimensional printing kits, methods of three-dimensional printing, vice versa, etc.

It is also understood that terms used herein will take on their ordinary meaning in the relevant technical field unless specified otherwise. In some instances, there are terms defined more specifically throughout the specification, and thus, these terms have a meaning as described herein.

Particulate Build Materials

In examples of the 3D printing kits and methods disclosed herein, the build material can include any particulate build material that includes from about 80 wt % to 100 wt % metal particles based on the total weight of the particulate build material. In other examples, the metal particles can be present in the particulate build material in amounts ranging from about 90 wt % to 100 wt %, or from about 95 wt % to 100 wt %, or in an amount of 100 wt %. When the metal particles are present in the particulate build material in an amount less than 100 wt %, the remainder of the particulate build material may be made up of additives, such as flow aids (e.g., in amounts ranging from about 0.05 wt % to about 0.2 wt %), polymer powder material, etc.

In some examples, the metal particles are uncoated. By "uncoated", it is meant that the metal particles do not have a polymeric coating formed thereon. The metal particles may, however, have a naturally formed metal oxide layer at its surface. In some examples, the particulate build material is devoid of a polymer resin (i.e., no polymer resin, either as a coating on the metal particles or separate from the metal particles is included).

In an example, the metal particles are a single phase metallic material composed of one element. In this example, the sintering temperature may be below the melting point of the single element. In another example, the metal particles are composed of two or more elements, which may be in the form of a single phase metallic alloy or a multiple phase metallic alloy. In these other examples, sintering generally occurs over a range of temperatures. With respect to alloys, materials with a metal alloyed to a non-metal (such as a metal-metalloid alloy) can be used as well.

In the examples disclosed herein, the particulate build material can include metal particles selected from the group consisting of aluminum, aluminum alloys, titanium, titanium alloys, copper, copper alloys, cobalt, cobalt alloys, chromium, chromium alloys, nickel, nickel alloys, vanadium, vanadium alloys, tin, tin alloys, tungsten, tungsten alloys, tungsten carbide, tantalum, tantalum alloys, molybdenum, molybdenum alloys, magnesium, magnesium alloys, gold, gold alloys, silver, silver alloys, zirconium, zirconium alloys, ferrous alloys, stainless steel, steel, and an admixture thereof. Specific alloy examples can include AlSi 10 Mg, 2xxx series aluminum, 4xxx series aluminum, CoCr MP1, CoCr SP2, Maraging steel MS1, HASTELLOY™ C, HASTELLOY™ X, NickelAlloy HX, INCONEL™ IN625, INCONEL™ IN718, stainless steel GP1, stainless steel 17-4PH, stainless steel 316L, stainless steel 430 L titanium 6AI4V, and titanium 6AI-4V ELI7. While several example alloys have been provided, it is to be understood that other alloys may be used.

The temperature(s) at which the metal particles of the particulate build material sinter together is/are above the temperature of the environment in which the patterning portion of the 3D printing method is performed, e.g., patterning at from about 18° C. to about 300° C. In an example, sintering (which may include de-binding and sintering) takes place at a temperature ranging from about 500° C. to about 3,500° C. In some examples, the metal particles may have a melting point ranging from about 500° C. to about 3,500° C. In other examples, the metal particles may be an alloy having a range of melting points.

The particle size of the particulate build material, and in particular of the metal particles, can be similarly sized or differently sized. In one example, the D50 particle size of the particulate build material can range from 0.5 μm to 200 μm. In some examples, the particles can have a D50 particle size distribution value that can range from about 2 μm to about 150 μm, from about 1 μm to about 100 μm, from about 1 μm to about 50 μm, etc. Individual particle sizes can be outside of these ranges, as the "D50 particle size" is defined as the particle size at which about half of the particles are larger than the D50 particle size and about half of the other particles are smaller than the D50 particle size (by weight based on the metal particle content of the particulate build material).

As used herein, "particle size" refers to the value of the diameter of spherical particles, or, for particles that are not spherical, can refer to the longest dimension of that non-spherical particle. The particle size can be presented as a Gaussian distribution or a Gaussian-like distribution (or normal or normal-like distribution). Gaussian-like distributions are distribution curves that may appear essentially Gaussian in their distribution curve shape, but which can be slightly skewed in one direction or the other (toward the smaller end or toward the larger end of the particle size distribution range). That being stated, an example Gaussian-like distribution of the metal particles can be characterized generally using "D10," "D50," and "D90" particle size distribution values, where D10 refers to the particle size at the $10^{th}$ percentile, D50 refers to the particle size at the $50^{th}$ percentile, and D90 refers to the particle size at the $90^{th}$ percentile. For example, a D50 value of 25 μm means that 50% of the particles (by number) have a particle size greater than 25 μm and 50% of the particles have a particle size less than 25 μm. Particle size distribution values are not necessarily related to Gaussian distribution curves, but in one example of the present disclosure, the metal particles can have a Gaussian distribution, or more typically a Gaussian-like distribution with offset peaks at about D50. In practice, true Gaussian distributions are not typically present, as some skewing can be present, but still, the Gaussian-like distribution can be considered to be essentially referred to as "Gaussian" as used conventionally. In yet other examples, the particles can have a D50 particle size distribution value of from about 2 μm to about 100 μm, from about 5 μm to about 75 μm, from about 25 μm to about 50 μm, from about 5 μm to about 15 μm, or from about 3 μm to about 10 μm.

The shape of the particles of the particulate build material can be spherical, non-spherical, random shapes, or a combination thereof.

Polymer (Latex) Particles

As mentioned above, to bind the particulate build material on a layer by layer basis and form a 3D intermediate part, a binder fluid with polymer particles can be used. The following discussion relates particularly to the polymer particles that can be used in the binder fluid. In some examples, the polymer particles are latex particles. Latex particles refer to any polymer (homopolymer, co-polymer, or heteropolymer) that is capable of being dispersed in an aqueous medium.

The polymer (latex) particles may have several different morphologies. In one example, the polymer particles can include two different copolymer compositions, which may be fully separated core-shell polymers, partially occluded mixtures, or intimately comingled as a polymer solution. In another example, the polymer particles can be individual spherical particles containing polymer compositions of hydrophilic (hard) component(s) and/or hydrophobic (soft) component(s) that can be interdispersed. In one example, the interdispersion can be according to IPN (interpenetrating networks) although it is contemplated that the hydrophilic and hydrophobic components may be interdispersed in other ways. In yet another example, the polymer particles can be composed of a hydrophobic core surrounded by a continuous or discontinuous hydrophilic shell. For example, the particle morphology can resemble a raspberry, in which a hydrophobic core can be surrounded by several smaller hydrophilic particles that can be attached to the core. In yet another example, the polymer particles can include 2, 3, or 4 or more relatively large polymer particles that can be attached to one another or can surround a smaller polymer core. In a further example, the polymer particles can have a single phase morphology that can be partially occluded, can be multiple-lobed, or can include any combination of any of the morphologies disclosed herein.

In some examples, the polymer particles can be heteropolymers or copolymers. In an example, a heteropolymer can include a hydrophobic component and a hydrophilic component. In this example, the heteropolymer can include a hydrophobic component that can include from about 65% to about 99.9% (by weight of the heteropolymer), and a hydrophilic component that can include from about 0.1% to about 35% (by weight of the heteropolymer). In one example, the hydrophobic component can have a lower glass transition temperature than the hydrophilic component.

Examples of monomers that may be used to form the hydrophobic component of the heteropolymer polymer (latex) particles include C4 to C8 alkyl acrylates or methacrylates, styrene, substituted methyl styrenes, polyol acrylates or methacrylates, vinyl monomers, vinyl esters, ethylene, maleate esters, fumarate esters, itaconate esters, or the like. Some specific example monomers can include, C1 to C20 linear or branched alkyl (meth)acrylate, alicyclic (meth) acrylate, alkyl acrylate, styrene, methyl styrene, polyol (meth)acrylate, hydroxyethyl (meth)acrylate, or a combination thereof. In one specific class of examples, the polymer (latex) particles can be a styrene (meth)acrylate copolymer. In still another example, the polymer (latex) particles can include a copolymer with copolymerized methyl methacrylate being present at about 50 wt % or greater, or copolymerized styrene being present at about 50 wt % or greater. Both can be present, with one or the other at about 50 wt % or greater in a more specific example.

The term "(meth)acrylate" or "(meth)acrylic acid" or the like refers to monomers, copolymerized monomers, etc., that can either be acrylate or methacrylate (or a combination of both), or acrylic acid or methacrylic acid (or a combination of both). In some examples, the terms "(meth)acrylate" and "(meth)acrylic acid" can be used interchangeably, as acrylates and methacrylates are salts and esters of acrylic acid and methacrylic acid, respectively. Furthermore, mention of one compound over another can be a function of pH. Furthermore, even if the monomer used to form the polymer was in the form of a (meth)acrylic acid during preparation, pH modifications during preparation or subsequently when added to an ejectable fluid, such as a binder fluid, can impact the nature of the moiety as well (acid form vs. salt or ester form). Thus, a monomer or a moiety of a polymer described as (meth)acrylic acid or as (meth)acrylate should not be read so rigidly as to not consider relative pH levels, ester chemistry, and other general organic chemistry concepts.

In still other examples, the polymer (latex) particles in the binder fluid include polymerized monomers of vinyl chloride, vinylidene chloride, vinylbenzyl chloride, vinyl ester, styrene, ethylene, maleate esters, fumarate esters, itaconate esters, α-methyl styrene, p-methyl styrene, methyl methacrylate, hexyl acrylate, hexyl methacrylate, hydroxyethyl acrylate, butyl acrylate, butyl methacrylate, ethyl acrylate, ethyl methacrylate, propyl acrylate, propyl methacrylate, 2-ethylhexyl acrylate, 2-ethylhexyl methacrylate, octadecyl acrylate, octadecyl methacrylate, stearyl methacrylate, 2-phenoxyethyl methacrylate, isobornyl acrylate, tetrahydrofurfuryl acrylate, benzyl methacrylate, benzyl acrylate, ethoxylated nonyl phenol methacrylate, isobornyl methacrylate, ethylene glycol dimethacrylate, diethylene glycol dimethacrylate, triethylene glycol dimethacrylate, cyclohexyl methacrylate, trimethyl cyclohexyl methacrylate, t-butyl methacrylate, n-octyl methacrylate, lauryl acrylate, lauryl methacrylate, trydecyl methacrylate, alkoxylated tetrahydrofurfuryl acrylate, isodecyl acrylate, dimethyl maleate, dioctyl maleate, acetoacetoxyethyl methacrylate, diacetone acrylamide, N-vinyl imidazole, N-vinylcarbazole, N-Vinylcaprolactam, pentaerythritol tri-acrylate, pentaerythritol tetra-acrylate, pentaerythritol tri-methacrylate, pentaerythritol tetra-methacrylate, glycidol acrylate, glycidol methacrylate, tetrahydrofuryl acrylate, tetrahydrofuryl methacrylate, diacetone acrylamide, t-butyl acrylamide, divinylbenzene, 1,3-butadiene, acrylonitrile, methacrylonitrile, combinations thereof, derivatives thereof, or mixtures thereof. These monomers include low glass transition temperature (Tg) monomers that can be used to form the hydrophobic component of a heteropolymer.

In examples of the present disclosure, the polymer (latex) particles include from about 1% to about 10% (based on the total weight of the polymer (latex) particles) of a phosphate functional group to improve adhesion between the metal particulate build material and the polymer (latex) particles in the binder fluid. In other examples, the polymer particles include from about 1% to about 5% of the phosphate functional group, or from about 2% to about 5% of the phosphate functional group (based on the total weight of the polymer (latex) particles).

Some examples of structures of phosphate monomers are shown in Table 1, identified as ID numbers 1-15.

TABLE 1

| ID # | Chemical Structure |
|---|---|
| 1 (PAM-100*) | Me—C(=CH$_2$)—C(=O)—[O—CH$_2$—CH$_2$]$_n$—OPO$_3$H$_2$ |
| 2 (PAM-200* and PAM-600*) | Methacrylate—O—[CH(CH$_3$)CH$_2$O]$_n$—P(=O)(OH)$_2$ |
| 3 (PAM-4000*) | Methacrylate—O—(CH$_2$)$_3$—P(=O)(OH)$_2$ |
| 4 | Methacrylamide—piperazine—CH$_2$CH$_2$—O—P(=O)(OH)$_2$ |
| 5 | Methacrylate—O—CH$_2$CH$_2$—NH—P(=O)(OH)$_2$ |
| 6 | Methacrylamide—NH—(CH$_2$)$_3$—N[CH$_2$P(=O)(OH)$_2$]$_2$ |
| 7 | 4-vinylbenzyl—N[CH$_2$P(=O)(OH)$_2$]$_2$ |
| 8 | Methacrylate—O—CH$_2$—CH(OH)—CH$_2$—N[CH$_2$P(=O)(OH)$_2$]$_2$ |
| 9 | Methacrylate—O—(CH$_2$)$_9$—O—P(=O)(OH)$_2$ |

TABLE 1-continued

| ID # | Chemical Structure |
|---|---|
| 10 | (phosphate acrylate structure) |
| 11 | (phosphate diacrylate structure) |
| 12 | (glycerol phosphate diacrylate structure) |
| 13 | (bis(methacryloyloxyethyl) phosphate structure) |
| 14 | (acrylamidoethyl phosphate structure) |
| 15 | (acrylamidobutyl phosphate structure) |

*SIPOMER ® series phosphate esters from Solvay USA Inc., where n is different for PAM 200 and PAM 600

In the examples disclosed herein, any of the examples of the phosphate monomers identified above (#1-15) may be used alone or in combination.

In an example, the phosphate functional group is formed from a polymerized phosphate monomer selected from the group consisting of any of the phosphate monomer identified above as numbers 1-15, and combinations thereof.

In an example, the phosphate monomer is a phosphate acrylate monomer.

In some examples, a composition of the polymer (latex) particles can include acidic monomer(s). In some examples, the acidic monomer content can range from 0.1 wt % to 5 wt %, from 0.5 wt % to 4 wt %, or from 1 wt % to 2.5 wt % of the polymer particles with the remainder of the polymer particle being composed of non-acidic monomers. Example acidic monomers can include acrylic acid, methacrylic acid, ethacrylic acid, dimethylacrylic acid, maleic anhydride, maleic acid, vinylsulfonate, cyanoacrylic acid, vinylacetic acid, allylacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, combinations thereof, derivatives thereof, or mixtures thereof. These acidic monomers are higher Tg hydrophilic monomers, than the low Tg monomers above, and can be used to form the hydrophilic component of a heteropolymer. Other examples of high Tg hydrophilic monomers can include acrylamide, methacrylamide, monohydroxylated monomers, monoethoxylated monomers, polyhydroxylated monomers, or polyethoxylated monomers.

In an example, the selected monomer(s) can be polymerized to form a polymer, heteropolymer, or copolymer with a co-polymerizable dispersing agent. The co-polymerizable dispersing agent can be a polyoxyethylene compound, such as a HITENOL® compound (Montello Inc.) e.g., polyoxyethylene alkylphenyl ether ammonium sulfate, sodium polyoxyethylene alkylether sulfuric ester, polyoxyethylene styrenated phenyl ether ammonium sulfate, or mixtures thereof.

Any suitable polymerization process can be used to form the polymer particles. In some examples, an aqueous dispersion of latex particles can be produced by emulsion polymerization or co-polymerization of any of the above monomers.

In one example, the polymer (latex) particles can be prepared by polymerizing high Tg hydrophilic monomers to form the high Tg hydrophilic component and attaching the high Tg hydrophilic component onto the surface of the low Tg hydrophobic component. In another example, the polymer (latex) particles can be prepared by polymerizing the low Tg hydrophobic monomers and the high Tg hydrophilic monomers at a ratio of the low Tg hydrophobic monomers to the high Tg hydrophilic monomers that ranges from 5:95 to 30:70. In this example, the low Tg hydrophobic monomers can dissolve in the high Tg hydrophilic monomers. In yet another example, the polymer (latex) particles can be prepared by polymerizing the low Tg hydrophobic monomers, then adding the high Tg hydrophilic monomers. In this example, the polymerization process can cause a higher concentration of the high Tg hydrophilic monomers to polymerize at or near the surface of the low Tg hydrophobic component. In still another example, the polymer (latex) particles can be prepared by copolymerizing the low Tg hydrophobic monomers and the high Tg hydrophilic monomers, then adding additional high Tg hydrophilic monomers. In this example, the copolymerization process can cause a higher concentration of the high Tg hydrophilic monomers to copolymerize at or near the surface of the low Tg hydrophobic component.

Other suitable techniques, specifically for generating a core-shell structure, can include grafting a hydrophilic shell onto the surface of a hydrophobic core, copolymerizing hydrophobic and hydrophilic monomers using ratios that lead to a more hydrophilic shell, adding hydrophilic monomer (or excess hydrophilic monomer) toward the end of the copolymerization process so there is a higher concentration of hydrophilic monomer copolymerized at or near the surface, or any other method can be used to generate a more hydrophilic shell relative to the core.

In one specific example, the low Tg hydrophobic monomers can be selected from the group consisting of C4 to C8 alkyl acrylate monomers, C4 to C8 alkyl methacrylate monomers, styrene monomers, substituted methyl styrene monomers, vinyl monomers, vinyl ester monomers, and combinations thereof; and the high Tg hydrophilic monomers can be selected from acidic monomers, unsubstituted amide monomers, alcoholic acrylate monomers, alcoholic methacrylate monomers, C1 to C2 alkyl acrylate monomers, C1 to C2 alkyl methacrylate monomers, and combinations thereof. The resulting polymer latex particles can exhibit a core-shell structure, a mixed or intermingled polymeric structure, or some other morphology.

In some examples, the polymer (latex) polymer can have a weight average molecular weight (Mw, g/mol) that can range from about 5,000 Mw to about 2,000,000 Mw. In yet other examples, the weight average molecular weight can range from about 100,000 Mw to about 1,000,000 Mw, from about 100,000 Mw to about 500,000 Mw, from about 150,000 Mw to about 300,000 Mw, or from about 50,000 Mw to about 250,000 Mw. Weight average molecular weight (Mw) can be measured by Gel Permeation Chromatography with polystyrene standard.

In some examples, the polymer (latex) particles can be latent and can be activated by heat (which may be applied iteratively during 3D intermediate part formation or after 3D intermediate part formation). In these instances, the activation temperature can correspond to the minimum film formation temperature (MFFT) or a glass transition temperature ($T_g$) which can be greater than ambient temperature. As mentioned herein, "ambient temperature" may refer to room temperature (e.g., ranging about 18° C. to about 22° C.). In one example, the polymer (latex) particles can have a MFFT or $T_g$ that can be at least about 15° C. greater than ambient temperature. In another example, the MFFT or the $T_g$ of the bulk material (e.g., the more hydrophobic portion) of the polymer (latex) particles can range from about 25° C. to about 200° C. In another example, the polymer (latex) particles can have a MFFT or $T_g$ ranging from about 40° C. to about 120° C. In yet another example, the polymer (latex) particles can have a MFFT or $T_g$ ranging from about 0° C. to about 150° C. In a further example, the polymer latex particles can have a $T_g$ that can range from about −20° C. to about 130° C., or in another example from about 60° C. to about 105° C. At a temperature above the MFFT or the $T_g$ of a latent latex polymer particle, the polymer particles can coalesce and can bind materials, such as the metal particles in the particulate build material.

The polymer (latex) particles can have a particle size that can be jetted via thermal ejection or printing, piezoelectric ejection or printing, drop-on-demand ejection or printing, continuous ejection or printing, etc. In an example, the particle size of the polymer (latex) particles can range from about 1 nm to about 400 nm. In yet other examples, a particle size of the polymer particles can range from about 10 nm to about 300 nm, from about 50 nm to about 250 nm, from about 100 nm to about 250 nm, or from about 25 nm to about 250 nm. In some examples, the polymer particles can have a particle size that can be jetted via thermal ejection or printing, piezoelectric ejection or printing, drop-on-demand ejection or printing, continuous ejection or printing, etc. In these examples, the particle size of the polymer particles may be about 100 nm or more.

In some examples, the polymer (latex) particles have a glass transition temperature higher than 60° C. and an average particle size of 1 nm or more.

Binder Fluids

As mentioned herein, to bind the particulate build material together during the build process to form a 3D intermediate part, a binder fluid can be applied to the particulate build material on a layer by layer basis.

In an example, the binder fluid includes the polymer particles having a phosphate functional group. As used herein, the term "binder fluid" refers to a fluid that includes water and polymer particles having a phosphate functional group(s) that are effective for binding layers of particulate build material when forming a 3D intermediate part. Further, the term "fluid" does not infer that the composition is free of particulate solids, but rather, can include solids dispersed therein, including carbon black pigment or disperse dyes, latex particles, or other dispersed solids. Although, in some examples, the binder fluid is devoid of any colorant (pigment or dye).

The example binder fluids disclosed herein can be aqueous fluids in the form of aqueous dispersions or solutions carried by an aqueous liquid vehicle. As used herein, the term "aqueous liquid vehicle" may refer to the liquid fluid to which the polymer particles are added to form an example of the binder fluid. The aqueous liquid vehicle can make up about 60 wt % to about 90 wt % of the example binder fluids. In other examples, the aqueous liquid vehicle can be included in the example binder fluids at from about 60 wt % to about 85 wt %, from about 60 wt % to about 80 wt %, from about 75 wt % to about 90 wt %, or from about 70 wt % to about 80 wt %, based on a total weight of the binder fluid.

In examples of the binder fluid, the polymer particles can be present, based on a total weight of the binder fluid, in an amount ranging from about 1 wt % to about 40 wt %. In other more detailed examples, the polymer particles can be present in an amount ranging from about 5 wt % to about 30 wt %, from about 12 wt % to about 22 wt %, from about 15 wt % to about 20 wt %, from about 10 wt % to about 20 wt %, or from about 6 wt % to about 18 wt %, based on the total weight of the binder fluid. These weight percentages represent active polymer particle amounts, and do not account for any water or other non-active components that may be part of a polymer particle solution or dispersion that is added to the binder fluid.

The aqueous liquid vehicle of the example binder fluids can include water, co-solvent(s), surfactant(s) and/or dispersing agent(s), antimicrobial(s), viscosity modifier(s), pH adjuster(s), sequestering agent(s), and the like. In one example, water can be present at from about 30 wt % to 100 wt % of the aqueous vehicle component—excluding polymer particles—based on a total weight of the aqueous liquid vehicle. In other examples, the water can be present at from about 60 wt % to about 95 wt %, from about 75 wt % to 100 wt %, or from about 80 wt % to about 99 wt %, based on a total weight of the aqueous liquid vehicle.

The co-solvent can be present at from about 0.5 wt % to about 50 wt % in the aqueous liquid vehicle, based on a total weight of the binder fluid. In some examples, the co-solvent can be a high boiling point solvent, which can have a boiling point of at least about 110° C. Example co-solvents can include aliphatic alcohols, aromatic alcohols, alkyl diols, glycol ethers, polyglycol ethers, lactams, caprolactams, formamides, acetamides, long chain alcohols, and combinations thereof. For example, the co-solvent can include aliphatic alcohols with a —CH$_2$OH group, secondary aliphatic alcohols, 1,2-alcohols, 1,3-alcohols, 1,5-alcohols, ethylene glycol alkyl ethers, propylene glycol alkyl ethers, C6 to C12 homologs of polyethylene glycol alkyl ethers, N-alkyl caprolactams, unsubstituted caprolactams, both substituted and unsubstituted formamides, both substituted and unsubstituted acetamides, combinations thereof, and the like. Other example organic co-solvents can include propyleneglycol ether, dipropyleneglycol monomethyl ether, dipropyleneglycol monopropyl ether, dipropyleneglycol monobutyl ether, tripropyleneglycol monomethyl ether, tripropyleneglycol monobutyl ether, dipropyleneglycol monophenyl ether, 2-pyrrolidone, 1,2-butanediol, 2-methyl-1,3-propanediol (MP-diol), and combinations thereof.

If a surfactant is included, examples can include SURFYNOL® SEF (a self-emulsifiable wetting agent based on acetylenic diol chemistry), SURFYNOL® 104 (a non-ionic wetting agent based on acetylenic diol chemistry), or SURFYNOL® 440 (an ethoxylated low-foam wetting agent) (all available from Evonik Industries AG, Germany); TERGITOL® TMN-6 (a branched secondary alcohol ethoxylate, non-ionic surfactant), TERGITOL® 15-S-5 or TERGITOL® 15-S-7 (each of which is a secondary alcohol ethoxylate, non-ionic surfactant), or DOWFAX® 2A1 or DOWFAX® 8390 (each of which is an alkyldiphenyloxide disulfonate, available from Dow, USA); CAPSTONE® FS-35 (non-ionic fluorosurfactant from DuPont, USA) or a combination thereof. The surfactant or combinations of surfactants can be present in the binder fluid at from about 0.1 wt % to about 5 wt % in the binder fluid based on the total fluid content weight, and in some examples, can be present at from about 0.5 wt % to about 2 wt %. These weight percentages represent active surfactant amounts, and do not account for any water or other non-active components that may be part of a surfactant solution or dispersion that is added to the binder fluid.

With respect to antimicrobials, any compound suitable to inhibit the growth of harmful microorganisms can be included. These additives may be biocides, fungicides, and other microbial agents. Examples of suitable antimicrobials can include NUOSEPT® (Troy, Corp.), UCARCIDE™, KORDEK™, ROCIMA™, KATHON™ (all available from The Dow Chemical Co.), VANCIDE® (R.T. Vanderbilt Co.), PROXEL® (Arch Chemicals), ACTICIDE® B20 and ACTICIDE® M20 and ACTICIDE® MBL (blends of 2-methyl-4-isothiazolin-3-one (MIT), 1,2-benzisothiazolin-3-one (BIT), and Bronopol (Thor Chemicals); AXIDE™ (Planet Chemical); NIPACIDE™ (Clariant), etc. In an example, the example binder fluids may include a total amount of antimicrobials that ranges from about 0.0001 wt % to about 1 wt %. These weight percentages represent active antimicrobial amounts, and do not account for any water or other non-active components that may be part of an antimicrobial solution or dispersion that is added to the binder fluids.

Sequestering agents such as EDTA (ethylene diamine tetra acetic acid) may be included to eliminate the deleterious effects of heavy metal impurities, and buffer solutions may be used to control the pH of the binder fluid. Whether a single chelating agent is used or a combination of chelating agents is used, the total amount of chelating agent(s) in the example binder fluids may range from greater than 0 wt % to about 2 wt % based on the total weight of the binder fluid. These weight percentages represent active sequestering/chelating agent amounts, and do not account for any water or other non-active components that may be part of a sequestering agent solution or dispersion that is added to the example binder fluids.

Viscosity modifiers and buffers may also be present, as well as other additives to modify properties of the binder fluid.

In some examples, the aqueous liquid vehicle(s) can also include from about 0.1 wt % to about 1 wt % of an anti-kogation agent, based on a total weight of the binder fluid. Kogation refers to the deposit of dried solids on a printhead. An anti-kogation agent can be included to prevent the buildup of dried solids on the printhead. Examples of suitable anti-kogation agents can include oleth-3-phosphate (commercially available as CRODAFOS™ O3 A or CRODAFOS™ N-3 acid), dextran 500 k, CRODAFOS™ HCE (phosphate-ester from Croda Int.), CRODAFOS® N10 (oleth-10-phosphate from Croda Int.), or DISPERSOGEN® LFH (polymeric dispersing agent with aromatic anchoring groups, acid form, anionic, from Clariant), etc.

Three-Dimensional Printing Kits and Methods of Three-Dimensional Printing

As used herein, a "material set" or "kit" can be synonymous with and understood to include a plurality of compositions comprising one or more components where the different compositions can be separately contained in one or more containers prior to and/or during use, e.g., building a green 3D object for subsequent fusing. These compositions of the "kit" can be combined together during a 3D build process. The containers can be any type of a vessel, box, or receptacle made of any material.

Referring now to FIG. 1, a 3D printing kit 100 is schematically shown and can include a particulate build material 110 including from about 80 wt % to 100 wt % metal particles based on the total weight of the particulate build material; and a binder fluid 120 including water, and polymer particles in an amount ranging from about 1 wt % to about 40 wt % based on a total weight of the binder fluid, the polymer particles having a phosphate functional group.

Thus, the 3D printing kit 100 includes the particulate build material 110, and binder fluid 120 to deliver polymer particles having a phosphate functional group to the particulate build material 110.

Figure 2:
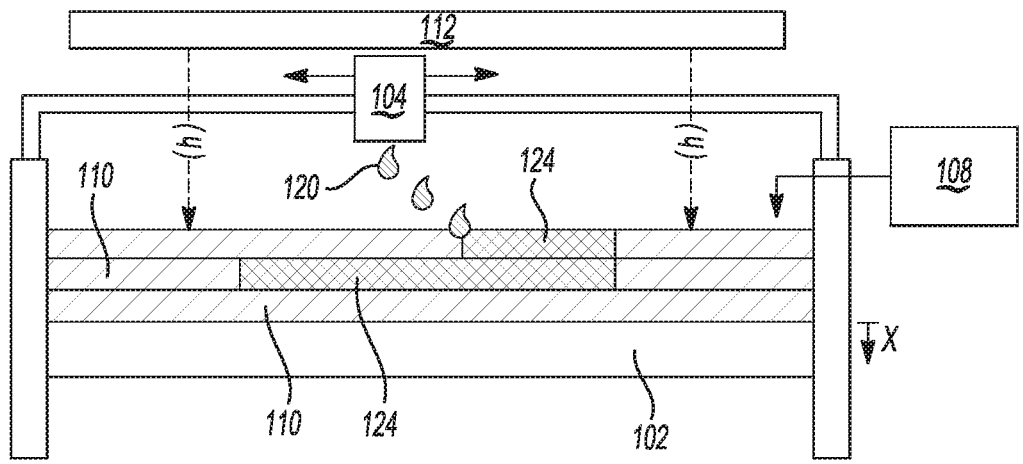
FIG. 2 graphically illustrates an example three-dimensional printing kit in use in accordance with an example three-dimensional printing method disclosed herein.

FIG. 2 illustrates an example of the 3D printing kit 100 in use. In this example, the particulate build material 110 is deposited from a particulate build material source 108 onto a build platform 102 where it can be flattened or smoothed, such as by a mechanical roller or other flattening mechanism or technique. The example binder fluid 120 includes the polymer particles having a phosphate functional group. The binder fluid 120 can be ejected onto the particulate build material 110 from a fluid ejector 104 (such as a thermal inkjet printhead or a piezoelectric inkjet printhead), for example, to provide for selective patterning of the particulate build material 110. The location(s) of the selective applied binder fluid 120 can be selected to correspond with a layer of a 3D printed object, such as from a 3D object model or computer model. The patterned portion(s) of the layer of the particulate build material 110 are shown at reference numeral 124.

Heat (h) can be used, such as from a heat source 112, at the various layers (or group of layers) to remove water from the binder fluid 120 throughout the patterning process. This temperature is 100° C. or less. In one example, heat can be applied from overhead, e.g., prior to application of the next layer of particulate build material, or after multiple layers are patterned, etc., and/or can be provided by the build platform 102 from beneath the particulate build material 110 and/or from the particulate build material source 108 (which may preheat the particulate build material 110 prior to dispensing it on the build platform 102 or on a previously applied and patterned layer).

After individual layers are patterned with binder fluid 120, the build platform 102 can be dropped a distance of (x), which can correspond to at least the thickness of a patterned layer in one example, so that another layer of the particulate build material 110 can be added thereon and patterned with the binder fluid 120, etc. The process can be repeated on a layer by layer basis until all of the desired layers are patterned in accordance with a 3D object model.

After the desired layers of particulate build material 110 are patterned with the binder fluid 120, heating the individually patterned layers is performed. This heating is performed at a temperature ranging from about 120° C. to about 200° C. At this temperature range, heating coalesces the (latex) polymer particles to form a strong polymer film. Without being bound to any theory, it is believed that heating may also improve the interaction between the phosphate functional group and the metal particle surface. As such, heating the individually patterned layers forms a polymeric network among the metal particles in the patterned portions 124 of the individually patterned layers, thereby forming a 3D intermediate object. The now cured portions form the 3D intermediate object, and any non-patterned build material surrounding the 3D intermediate object remains non-cured.

The 3D intermediate part, in this example, includes a 3D object formed of cured/solidified 3D intermediate part layers, which include both particulate build material and a network of polymeric particles having phosphate functional group(s) holding the particulate build material together. The 3D intermediate part that is formed is stable enough to be moved to an oven (or other heating device) suitable for de-binding and sintering e.g., annealing, melting, fusing, or the like.

Figure 3:
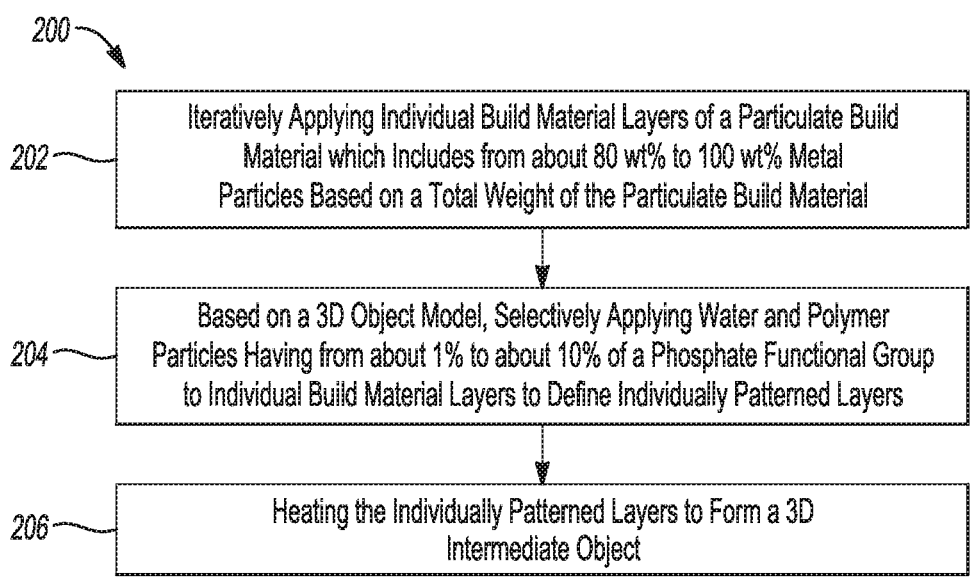
FIG. 3 is a flow diagram illustrating an example method of three-dimensional printing in accordance with the present disclosure.

In another example, as shown in FIG. 3, a method 200 of three-dimensional printing can include iteratively applying individual build material layers of a particulate build material which includes from about 80 wt % to 100 wt % metal particles based on a total weight of the particulate build material (reference numeral 202); based on a 3D object model, selectively applying water and polymer particles having a phosphate functional group to individual build material layers to define individually patterned layers (reference numeral 204); and heating the individually patterned layers to form a 3D intermediate object (reference numeral 206).

Following application of the binder fluid, the particulate build material and binder fluid applied thereto can be heated to an elevated temperature. Heating cures the polymer particles to form a network (which may include π-π interaction). This network solidifies the 3D intermediate part in preparation for moving to a sintering oven. In one example, heating to cure can be carried out at from about 120° C. to about 200° C. or from about 140° C. to about 180° C. for time sufficient to solidify or stabilize the 3D intermediate part for movement to a sintering oven. Lower curing temperatures help to minimize the migration of surfactants and other chemicals from the patterned build material to the non-patterned build material. As such, the ability to de-cake the 3D intermediate part from the non-patterned build material is improved. Reducing migration of the binder fluid into the non-patterned build material also improves the recyclability of the non-patterned build material.

Heating may occur after patterning of the desired number of layers, and thus the time frames can vary depending on size of the 3D intermediate part. For example, large objects with a smaller surface to volume ratio may take longer to drive off enough fluid to stabilize the 3D intermediate part, than a smaller object with a larger surface to volume ratio. That stated, time frames for heating the patterned layers can be from about 10 minutes to about 8 hours, or from about 30 minutes to about 3 hours. In many cases, individual layers can be heated at temperatures at or below 100° C. during the build, and additional, high temperature heating (120° C. to about 200° C.) can occur after patterning, in order to form the 3D intermediate part.

Upon coalescing or otherwise binding of the particulate build material by the polymer particles having the phosphate functional group, the 3D intermediate part with enhanced tensile strength can be moved to a heating device, such as a sintering oven.

In an example, a method of three-dimensional printing further includes separating the 3D intermediate part/object from non-patterned particulate build material; and heating the 3D intermediate object at higher temperatures to form a 3D object.

In one example, the heating at higher temperatures can be a temperature ranging from about 500° C. to about 3,500° C. At lower temperatures within the range, the network of the polymer particles can thermally degrade, thereby debinding the 3D intermediate part, and at the higher temperatures within the range, the metal particles are sintered together. In another example, the de-binding and sintering temperatures can be in the range of from about 600° C. to about 1,500° C., or from about 800° C. to about 1,200° C. The de-binding temperature range can vary, depending on the composition of the network (e.g., polymer particles). The sintering temperature range can vary, depending on the metal particle material. In one example, the sintering temperature can range from about 10° C. below the melting temperature of the metal particles of the particulate build material to about 50° C. below the melting temperature of the metal particles of the particulate build material. In another example, the sintering temperature can range from about 100° C. below the melting temperature of the metal particles of the particulate build material to about 200° C. below the melting temperature of the metal particles of the particulate build material. The sintering temperature can also depend upon the particle size and period of time that heating occurs, e.g., at a high temperature for a sufficient time to cause particle surfaces to become physically merged or composited together. For example, a sintering temperature for stainless steel can be about 1,400° C. and an example of a sintering temperature for aluminum or aluminum alloys can range from about 550° C. to about 620° C. Temperatures outside of these ranges can be used as determined on a case by case basis.

During heating in the oven, the heating device can include an inert atmosphere to avoid oxidation of the metal particles. In one example, the inert atmosphere can be oxygen-free and can include a noble gas, an inert gas, or combination thereof. For example, the inert atmosphere can include a noble gas or an inert gas selected from argon, nitrogen, helium, neon, krypton, xenon, radon, hydrogen, or a combination thereof. Upon removal of the sintered 3D object from the oven and cooling (or annealing by controlling the cool down rate in the oven), the sintering 3D object can be treated or polished, such as by sand blasting, bead blasting, air jetting, tumble finishing such as barrel finishing, vibratory finishing, or a combination thereof. Tumble or vibratory finishing techniques can be performed wet (involving liquid lubricants, cleaners, or abrasives) or dry.

In any of the methods disclosed herein, different shaped objects may be printed in different orientations within the printing system. As such, while the object may be printed from the bottom of the object to the top of the object, it may alternatively be printed starting with the top of the object to the bottom of the object, or from a side of the object to another side of the object, or at any other orientation that is suitable or desired for the particular geometry of the part being formed.

To further illustrate the present disclosure, an example is given herein. It is to be understood that this example is provided for illustrative purposes and is not to be construed as limiting the scope of the present disclosure.

EXAMPLE

A series of latex particles were prepared with phosphate acrylate monomers. In Table 2, ML-041 is a latex without phosphate functional groups (as a control). ML-046 to 049 have the same composition as ML-041, except part of the methyl methacrylate was replaced with phosphate monomers (examples of monomers shown in Table 1 above). Emulsion polymerization was used to synthesize these polymer latexes.

TABLE 2

Latex with Phosphate Functional Monomers

| Latex ID | MMA (wt %) | Styrene (wt %) | BA (wt %) | MAA (wt %) | Phosphate monomer ID & (wt %) | Size (nm) | % Solid |
|---|---|---|---|---|---|---|---|
| ML-041 | 82 | 10 | 7 | 1 | None | 205 | 32.2 |
| ML-046 | 79 | 10 | 7 | 1 | PAM-100 (3) | 220 | 31.9 |
| ML-047 | 79 | 10 | 7 | 1 | PAM-200 (3) | 218 | 32.5 |
| ML-048 | 79 | 10 | 7 | 1 | PAM-600 (3) | 215 | 32.1 |
| ML-049 | 79 | 10 | 7 | 1 | PAM-4000 (3) | 206 | 32.2 |

MMA: methyl methacrylate; BA: n-Butyl Acrylate; MAA: methacrylic acid
SIPOMER ® PAM-100-a phosphate ester of a polyethylene glycol monomethacrylate
SIPOMER ® PAM-200-a phosphate ester of a polypropylene glycol monomethacrylate
SIPOMER ® PAM-600-a phosphate ester of a polypropylene glycol monomethacrylate
SIPOMER ® PAM-4000-ethylmethacrylate phosphate Synthesis of ML-046 (as an example) was as follows:

A one liter 4-neck round bottom flask, a mechanical stirrer, a condenser, a nitrogen inlet and a monomer feed adapter were attached. The flask was immersed in a constant temperature bath at 85 degrees C. A monomer emulsion was prepared as follows. 285.4 grams of deionized water, 1.71 grams of sodium bicarbonate, 1.65 grams of azobis(4-cyanoovaleeric acid), 4.95 grams of SIPOMER PAM-100 (a phosphate ester of a polyethylene glycol monomethacrylate, available from Solvay USA Inc., Princeton, NJ), and 33.02 grams (25%) of HITENOL AR-1025 (a polyoxyethylene dispersing agent) were mixed (and the pH was adjusted to 9) until all ingredients were dissolved. A monomer mixture including 130.42 grams of methyl methacrylate, 16.51 grams of styrene, 11.56 grams of n-butyl acrylate, and 1.65 grams of methacrylic acid was poured slowly into the aqueous solution with stirring until a good monomer emulsion was formed. The monomer emulsion was kept under a nitrogen blanket and stirred continuously. 10% of the monomer emulsion was pumped to the reactor and polymerized to form seed latex particles. The remaining monomer emulsion was pumped into the reactor over a period of about 4 hours. A milky latex was obtained. The latex was cooled to room temperature and filtered through a 400 mesh sieve to remove any precipitate. The Z-average particle size measured by Malvern PCS was about 220 nm. % Solid was about 31.9%. The rest of the latexes in Table 2 were synthesized by the same procedure except 3% of MMA was replaced with phosphate acrylate monomers.

To evaluate the tensile strength of a binder fluid including polymer particles with a phosphate functional group and a comparative binder fluid without a phosphate functional group (PB-228), the following binder fluid formulations were prepared, according to Table 3:

TABLE 3

| Binder Fluid Components | % Active | PB-228 (Control) (wt %) | PB-229 (wt %) | PB-230 (wt %) | PB-231 (wt %) | PB-232 (wt %) |
|---|---|---|---|---|---|---|
| 1,2-butanediol | As is | 26 | 26 | 26 | 26 | 26 |
| Tergitol ® 15-S-7 | 100 | 0.9 | 0.9 | 0.9 | 0.9 | 0.9 |
| Tergitol ® TMN-6 | 90 | 0.9 | 0.9 | 0.9 | 0.9 | 0.9 |

TABLE 3-continued

| Binder Fluid Components | % Active | PB-228 (Control) (wt %) | PB-229 (wt %) | PB-230 (wt %) | PB-231 (wt %) | PB-232 (wt %) |
|---|---|---|---|---|---|---|
| Cyan Dye* | 12.72 | 0.4 | 0.4 | 0.4 | 0.4 | 0.4 |
| ML-041-R1 (control) | 32.2 | 12 | | | | |
| ML-046 | 31.9 | | 12 | | | |
| ML-047 | 32.5 | | | 12 | | |
| ML-048 | 32.1 | | | | 12 | |
| ML-049 | 32.2 | | | | | 12 |
| Water | | Bal. | Bal. | Bal. | Bal. | Bal. |

*dye is added to visually observe the binder fluid

Individual press bar samples were prepared. The samples included particulate build material with 100 wt % stainless steel particles having a D50 particle size of about 22 μm admixed with the various binder fluids of Table 3. To prepare the individual samples, a mixture of the stainless steel particles and the respective binder fluids were mixed in a high speed mixer to ensure homogenous mixing at a weight ratio of about 19:1 (94.8 wt % stainless steel particles; 5.2 wt % binder fluid) and then the wet particles/binder homogenous mixture was dried in a vacuum oven at a temperature ranging from about 30° C. to about 40° C. for two hours to remove most of the water content, leaving a dried homogenous mixture of binder solids and stainless steel particles.

18 grams of the dried homogenous mixture was poured into the opening of a press bar mold and pressed under 2000 psi for 30 seconds to form the respective press bar samples. The dimension of the press bar samples, shown schematically at 151 in FIG. 4, was 50 mm (length) by 12 mm (width) by 5.5 mm (thickness). The individual press bar samples were then carefully separated from the mold and heated in a vacuum oven. The heating conditions included two stages. The first stage included heating at 160° C. for about 10 minutes without vacuum; and the second stage included heating at 160° C. at 22-25 inches Hg for 30 minutes with a slow stream of air to provide for removal of solvents and some or even full curing of the polymer particle binder.

Figure 4:
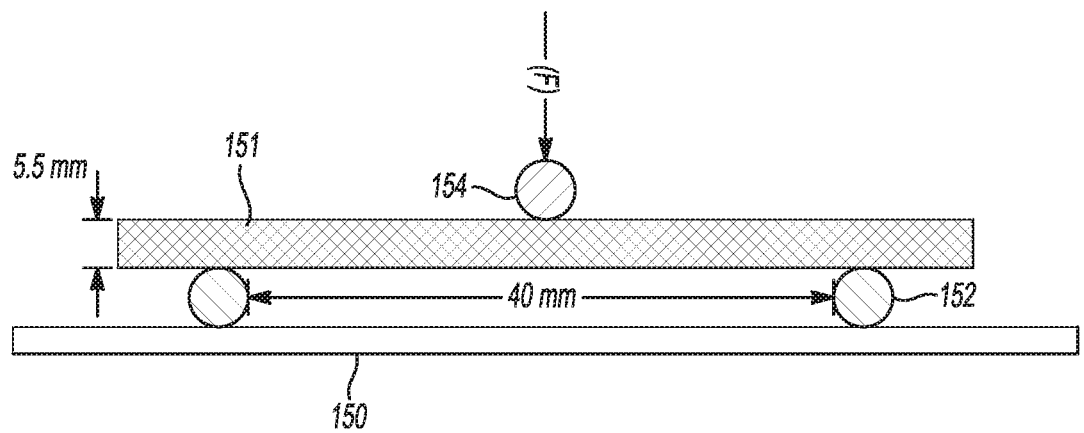
FIG. 4 illustrates an example tensile strength apparatus that can be used to evaluate tensile strength provided by various compositions for use in 3D printing kits in accordance with the present disclosure.

A tensile strength test was conducted as shown in FIG. 4. The individual cured press bar samples were then cooled and submitted to a 3-point bend INSTRON® tester, as shown by example in FIG. 4, to measure their tensile strength. The INSTRON® tester, available from Instron (USA), included a support 150, supporting pins 152, and a loading pin 154 which applied increasing force (F) to the individual press bar samples until they failed (broke under force). For the various individual press bar samples, at least five press bars were made and the average maximum tensile stress (mPa) and standard deviation were reported. The average data of this study is provided in Table 4 and shown in FIG. 5.

TABLE 4

| Press Bar Sample ID | Phosphate Monomer ID | Average Maximum Tensile Stress (mPa) | Standard Deviation |
|---|---|---|---|
| PB-228 | None - Control | 5.168 | 0.35 |
| PB-229 | 3 wt % PAM-100 | 7.214 | 0.19 |
| PB-230 | 3 wt % PAM-200 | 6.928 | 0.35 |
| PB-231 | 3 wt % PAM-600 | 6.69 | 0.27 |
| PB-232 | 3 wt % PAM-4000 | 8.078 | 0.16 |

Figure 5:
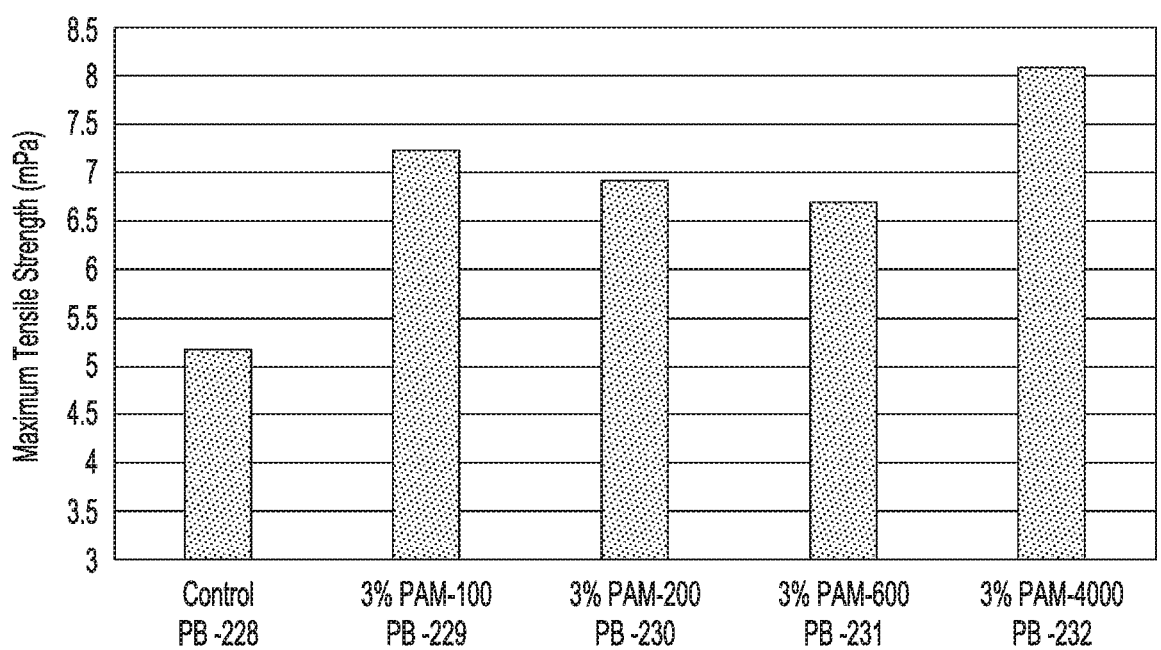
FIG. 5 is a graph showing the maximum tensile strength for press bars made using examples of a binder fluid composition disclosed herein, and comparative press bars made using a comparative binder fluid composition.

As can be seen from Table 4 and FIG. 5, binder fluids including polymer particles with a phosphate functional group can be effective in improving the tensile stress of a press bar (and a 3D intermediate part), as compared with a binder fluid including polymer particles without a phosphate functional group. It appears that the phosphate functional group is very effective to improve the adhesion between the latex binder and the metal powder (especially fluid PB-232 containing PAM-4000). Without being bound to any theory, it is believed that the phosphate functional group(s) on the latex particle surface form strong covalent bonds with the metal oxide on the surface of metal powder.

It was also noted that the amount of polymer particles (e.g., 12 wt %) was at the lower end of the range disclosed herein. Even with this relatively low amount, the addition of the phosphate functional group exhibited improved strength.

It is to be understood that the ranges provided herein include the stated range and any value or sub-range within the stated range, as if such values or sub-ranges were explicitly recited. For example, from about 500° C. to about 3,500° C. should be interpreted to include not only the explicitly recited limits of from about 500° C. to about 3,500° C., but also to include individual values, such as about 690° C., 1,000.5° C., 2,055° C., 2,750° C., etc., and sub-ranges, such as from about 900° C. to about 3,250° C., from about 525° C. to about 2,500° C., from about 1,020° C. to about 2,020° C., etc. Furthermore, the term "about" as used herein in reference to a numerical value or range, allows for a degree of variability in the value or range, for example, within 10%, or, in one aspect within 5%, of a stated value or of a stated limit of a range.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is noted that, as used in this specification and the appended claims, the singular forms "a," "an," and "the" include plural referents unless the content clearly dictates otherwise.

While several examples have been described in detail, it is to be understood that the disclosed examples may be modified. Therefore, the foregoing description is to be considered non-limiting.

What is claimed is:

1. A three-dimensional printing kit, comprising:
   a particulate build material including from 80 wt % to 100 wt % of metal particles based on a total weight of the particulate build material; and
   a binder fluid including water and polymer particles in an amount ranging from 1 wt % to 40 wt % based on a total weight of the binder fluid, the polymer particles having from 1% to 10% of a phosphate functional group,
   wherein the phosphate functional group is formed from a polymerized phosphate monomer selected from the group consisting of:
   a phosphate ester of a polyethylene glycol monomethacrylate;
   a phosphate ester of a polypropylene glycol monomethacrylate;

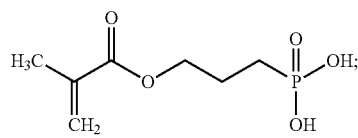

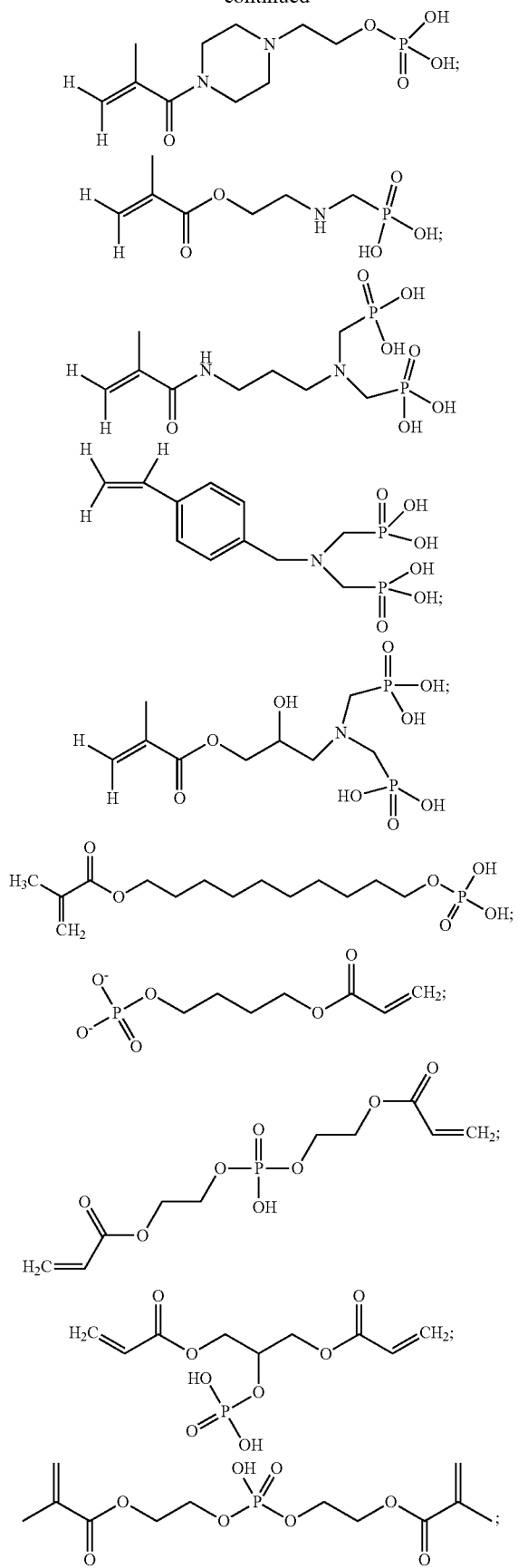

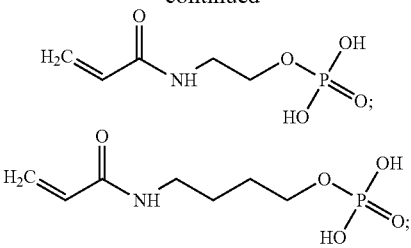

and combinations thereof.

2. The three-dimensional printing kit as defined in claim 1 wherein:
the polymer particles include a hydrophobic component and a hydrophilic component;
the hydrophobic component is formed from a polymerized hydrophobic monomer selected from the group consisting of C4 to C8 alkyl acrylate monomers, C4 to C8 alkyl methacrylate monomers, styrene monomers, substituted methyl styrene monomers, vinyl monomers, vinyl ester monomers, and combinations thereof; and
the hydrophilic component is formed from a polymerized hydrophilic monomer selected from the group consisting of acidic monomers, unsubstituted amide monomers, alcoholic acrylate monomers, alcoholic methacrylate monomers, C1 to C2 alkyl acrylate monomers, C1 to C2 alkyl methacrylate monomers, and combinations thereof.

3. The three-dimensional printing kit as defined in claim 2 wherein the acidic monomers are selected from the group consisting of acrylic acid, methacrylic acid, ethacrylic acid, dimethylacrylic acid, maleic anhydride, maleic acid, vinylsulfonate, cyanoacrylic acid, vinylacetic acid, allylacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy) propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, and combinations thereof.

4. The three-dimensional printing kit as defined in claim 2 wherein the polymerized hydrophilic monomer is selected from the group consisting of acrylamide, methacrylamide, monohydroxylated monomers, monoethoxylated monomers, polyhydroxylated monomers, and polyethoxylated monomers.

5. The three-dimensional printing kit as defined in claim 1 wherein the binder fluid further includes a co-solvent present in an amount ranging from 0.5 wt % to 50 wt %, based on the total weight of the binder fluid.

6. The three-dimensional printing kit as defined in claim 1 wherein the polymer particles have a glass transition temperature higher than 60° C. and an average particle size of 1 nm or more.

7. The three-dimensional printing kit as defined in claim 1 wherein the metal particles are selected from the group consisting of aluminum, aluminum alloys, titanium, titanium alloys, copper, copper alloys, cobalt, cobalt alloys, chromium, chromium alloys, nickel, nickel alloys, vanadium, vanadium alloys, tin, tin alloys, tungsten, tungsten alloys, tungsten carbide, tantalum, tantalum alloys, molybdenum, molybdenum alloys, magnesium, magnesium alloys, gold, gold alloys, silver, silver alloys, zirconium, zirconium alloys, ferrous alloys, stainless steel, steel, and an admixture thereof.

8. A method of three-dimensional printing, comprising:
iteratively applying individual build material layers of a particulate build material which includes from 80 wt % to 100 wt % of metal particles based on a total weight of the particulate build material;
based on a 3D object model, selectively applying a binder fluid to the individual build material layers to define individually patterned layers, the binder fluid including water and polymer particles in an amount ranging from 1 wt % to 40 wt % based on a total weight of the binder fluid, the polymer particles having from 1% to 10% of a phosphate functional group; and
heating the individually patterned layers to form a 3D intermediate object,
wherein the phosphate functional group of the polymer particles of the binder fluid is formed from a polymerized phosphate monomer selected from the group consisting of:
a phosphate ester of a polyethylene glycol monomethacrylate;
a phosphate ester of a polypropylene glycol monomethacrylate;

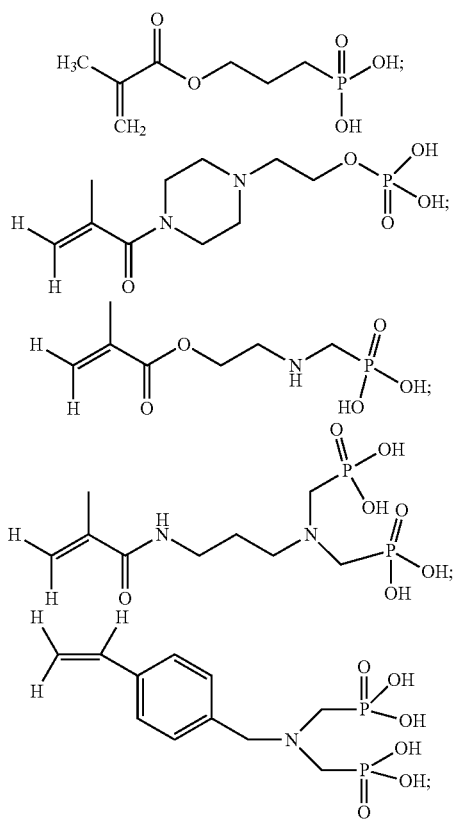

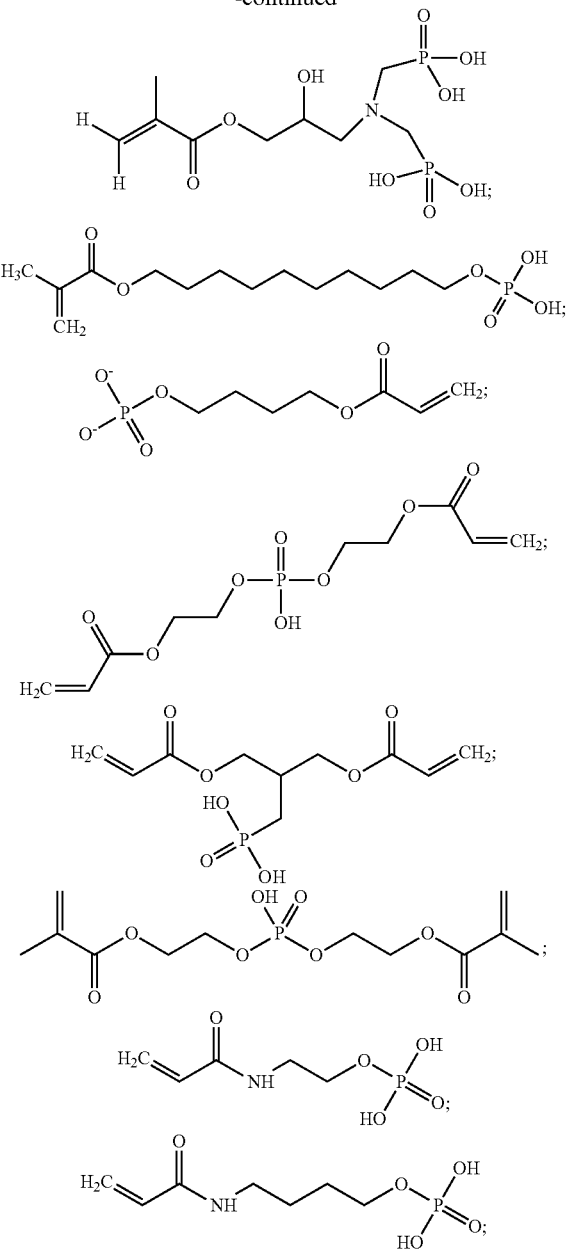

and
combinations thereof.
9. The method as defined in claim 8 wherein:
the heating occurs at a temperature ranging from 120° C. to 200° C.; and
the method further comprises:
separating the 3D intermediate object from non-patterned particulate build material; and
heating the 3D intermediate object at higher temperatures to form a 3D object.

* * * * *